United States Patent
Alter

(10) Patent No.: US 12,457,522 B2
(45) Date of Patent: Oct. 28, 2025

(54) THROTTLING TEXT MESSAGING ON-THE-FLY BASED ON CUSTOMER SPECIFIC THROUGHPUT ALLOTMENT

(71) Applicant: Telgorithm Inc., Northridge, CA (US)

(72) Inventor: Aaron Alter, Los Angeles, CA (US)

(73) Assignee: Telgorithm Inc., Northridge, CA (US)

( * ) Notice: Subject to any disclaimer, the term of this patent is extended or adjusted under 35 U.S.C. 154(b) by 446 days.

(21) Appl. No.: 18/196,392

(22) Filed: May 11, 2023

(65) Prior Publication Data

US 2023/0379756 A1 Nov. 23, 2023

Related U.S. Application Data

(60) Provisional application No. 63/342,778, filed on May 17, 2022.

(51) Int. Cl.
*H04W 28/02* (2009.01)
*G06Q 30/0251* (2023.01)
*H04W 4/12* (2009.01)

(52) U.S. Cl.
CPC .... *H04W 28/0289* (2013.01); *G06Q 30/0267* (2013.01); *H04W 4/12* (2013.01); *H04W 28/0268* (2013.01)

(58) Field of Classification Search
CPC ............. H04W 28/0289; H04W 4/12; H04W 28/0268; H04W 4/14; G06Q 30/0267
See application file for complete search history.

(56) References Cited

U.S. PATENT DOCUMENTS

| | | | | |
|---|---|---|---|---|
| 2006/0072723 | A1* | 4/2006 | Chung | H04L 51/214 379/93.24 |
| 2016/0104191 | A1* | 4/2016 | Graziano | G06Q 30/0277 705/14.45 |
| 2022/0122119 | A1* | 4/2022 | Li | G06Q 30/0243 |

* cited by examiner

*Primary Examiner* — Michael A Keller
(74) *Attorney, Agent, or Firm* — Fenwick & West LLP

(57) ABSTRACT

An online system receives a request from a customer system to send a text message to a recipient system, the request including a phone number of the recipient system. The online system sends a query to a registry system for a throughput allotment applicable to the text message. The online system sends a query to determine the MNO that is associated with the phone number of the recipient system and queries a log to determine a number of messages sent during a previous time period by the customer system to other recipients associated with the MNO of the recipient system. The online system compares the number of messages from the log to the throughput allotment for the MNO to determine whether the throughput allotment has been reached. The online system schedules the sending of the text message to the recipient system in order to comply with the throughput allotment.

14 Claims, 3 Drawing Sheets

THROTTLING TEXT MESSAGING ON-THE-FLY BASED ON CUSTOMER SPECIFIC THROUGHPUT ALLOTMENT

CROSS REFERENCE TO RELATED APPLICATIONS

This application claims the benefit of U.S. Provisional Application No. 63/342,778, filed May 17, 2022, which is incorporated by reference in its entirety.

BACKGROUND

This invention relates the throughput allotment of text messages on mobile networks. Text messaging was originally developed for person-to-person (P2P) uses, but it has become a popular means of communicating by businesses to their customers or prospective customers. Now, businesses (or advertising entities, on behalf of brands) often use a messaging service to create campaigns and then send text messages for those campaigns to individual users. However, the nature of business text messaging is different than the P2P path, as business messaging typically involves sending messages to a large number of users at a time. Accordingly, the P2P path for text messaging is not suitable for businesses, because businesses need a much higher throughput. As a result, the Mobile Network Operators (MNOs) created a new text messaging path, called Application to Person (A2P), for businesses to message to their customers.

SUMMARY

To address this problem an online system, acting as a Connectivity Partner, receives a request to send a text message from a business sender to a list of recipients. The online system looks up the business's brand ID and then uses that brand ID to query The Campaign Registry (TCR) for the throughput allotments for each of the MNOs for the brand and campaign associated with the text messages. For each recipient of the text message, the online system also queries for the MNO associated with the recipient to determine which throughout allotment applies for that recipient. The online system also maintains a log of the messages that have been already sent so that the usage of the current period's throughput allotments can be determined. Based on this information, the system determines on the fly, for each recipient, whether sending the message would exceed the applicable throughput allotment. Based on this determination, the system either sends the message immediately or queues the message for later sending. This more efficiently uses the throughput allotment associated with the brand and campaign for each of the MNOs.

In one or more embodiments, the online system receives a request from a customer system to send a text message to a recipient system, the request including a phone number of the recipient system. The text message may include other media beyond text such as images, videos, or links. The request may include information such as a phone number associated with the customer system, and the content of the text message. In some embodiments, the online system determines a brand campaign associated with the customer system based on the phone number associated with the customer system in the request. For example, a business user may use a customer application to compose a text message and to initiate sending that text message to a list of recipients. The customer application may then send an API call to an online system of the Connectivity Partner, where the API call includes details such as the phone number associated with the customer, the phone number for each recipient on the list of recipients, and actual content of the message to be sent, which may include text or other media.

The online system sends a query to a registry system for a throughput allotment applicable to the text message. The throughput allotment specifies, for a given campaign of the customer, limitations on the number of messages that the customer can send over a time period (e.g., per day). The throughput allotment may vary from campaign to campaign, and across MNOs, for a given customer. In some embodiments, the throughput allotment may be based on the brand campaign associated with the text message and request. For example, the online system may perform an internal lookup of the number associated with the customer to determine which messaging configuration file the number is associated with, enabling the online system to determine the brand ID of the customer who is sending the text message and the campaign ID associated with the message. The online system may use the queried brand ID and campaign ID for the text message to query the TCR for the approved throughout allotment for each MNO.

The online system sends a query to determine the MNO of the set of MNOs that is associated with the phone number of the recipient system. For example, the online system may find the MNO of each recipient on the list of recipients by using a publicly available API call (e.g., NetNumber/OSR MNO Number Lookup API), and then store the MNO for each recipient.

The online system queries a log to determine a number of messages sent during a previous time period by the customer system to other recipients associated with the MNO of the recipient system. In some embodiments, the online system may maintain a log of the text messages sent for the current time period (e.g., day), where the log specifies the brand and campaign associated with the text message and the MNO of the phone number of each recipient to which a message was previously sent.

The online system compares the number of messages from the log to the throughput allotment for the MNO of the recipient system to determine whether the throughput allotment has been reached. For example, before sending the text message to each recipient, the online system may be able to identify the applicable throughput allotment based on the MNO of the phone number of the recipient and check the log to determine if the MNO's throughput allotment for the brand campaign would be exceeded if the new message were sent. Based on this information, the online system is able to determine whether sending the message would exceed the applicable throughput allotment.

The online system schedules the sending of the text message to the recipient system, the scheduling complying with the throughput allotment based on the comparing. For example, if the throughput allotment would be exceeded, the online system may queue the message for sending at a later period. If applicable throughput allotment would not be exceeded, the online system may send the text message to the recipient immediately and update the log. In some embodiments, the online system may schedule the sending of the text message by determining that the throughput allotment has not been reached and thus sending the text message. In some embodiments, the online system may schedule the sending of the text message by determining that the throughput allotment has been reached and scheduling the text message to be sent at a later time period. In another example, once the online system determines that the message can be sent, the online system may send the message via an API call to an upstream aggregator. The MNO may then send the message from the phone number associated with the customer to the phone number of a recipient, where the message includes the payload content from the original customer API request.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
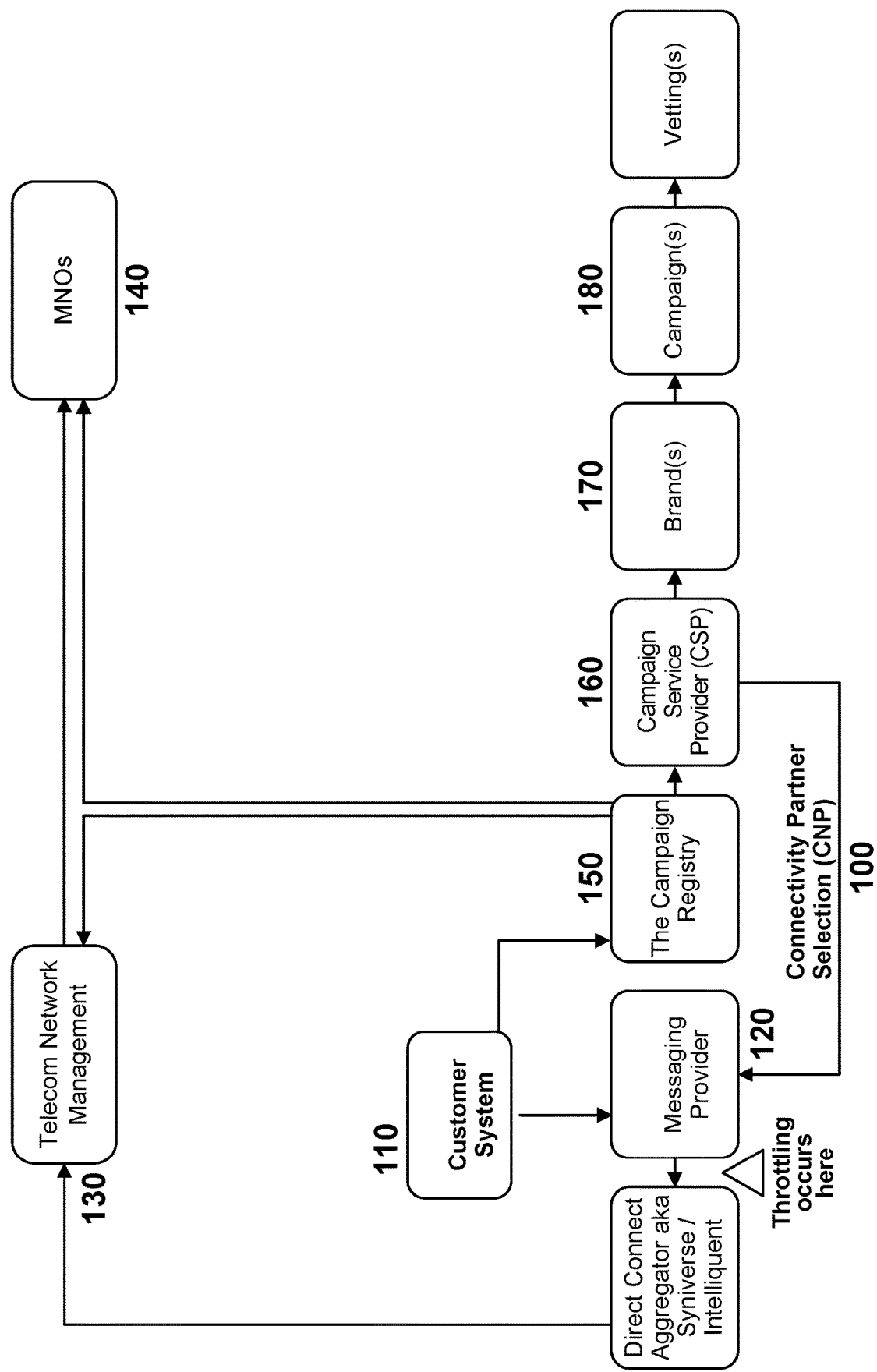
FIG. 1 illustrates an example of an Application to Person messaging path diagram, in accordance with one or more embodiments.

FIG. 1 illustrates an example of the Application to Person messaging path diagram, in accordance with some embodiments. The messaging path illustrated in FIG. 1 includes connectivity partner selection 100, customer system 110, messaging provider 120, Telecom Network Management 130, MNO 140, The Campaign Registry 150, Campaign Service Provider 160, Brand 170, and Campaign 180. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

When a customer system 110 wants to send a text message to a list of users, the customer system 110 composes and then send the text message using a Campaign Service Provider 160. The Campaign Service Provider 160 connects to the messaging provider 120 via a connectivity partner selection 100 which is how brand 170 and campaign 180 become associated with messaging provider 120. The Campaign Service Provider 160 sends the text messages to a messaging provider 120 to send via the network created by the MNOs 140 (e.g., AT&T, T-Mobile, Verizon, U.S. Cellular). However, the messaging provider 120 does not have direct access to the throughput allotments allocated to the corresponding brand 170 and campaign 180 under which the text message is being sent. Moreover, the messaging provider 120 does not even have access to the MNO 140 of the recipients for the messages (the throughput allotments are applied based on the recipients' MNO). Therefore, the messaging provider 120 typically assumes a worst-case throughput allotment and therefore caps the brand 170 or campaign 180 at the lowest throughput of the set of the MNOs 140. As a result, the messaging provider 120 unduly throttles the text messages, and the business's total throughput allotment is not used efficiently while the messages take longer to be delivered than the throughput allotment would have allowed.

The Campaign Registry 150 manages the brand 170, a type of business profile for a customer system 110, and the campaign 180 that is created for each brand 170. The customer system 110 first registers with The Campaign Registry 150, e.g., by providing a tax ID, and The Campaign Registry 150 then created a unique identifier for the brand 170. The information provided by the customer system 110 to The Campaign Registry 150 can include company information, Tax IDs, messaging content, information about brand 170, and information about campaign 180. A brand 170 can then create one or more campaigns, where messages are to be sent under one of those campaigns. For each brand 170 and campaign 180, The Campaign Registry 150 also stores the throughput allotment that was approved for the brand-campaign by each MNO 140. For some MNOs 140, the throughput is an overall limit for a brand 170, which applies across all the campaigns 180 of a brand 170. For other MNOs 140, the throughput is assigned individually for each campaign of a brand.

To send the message, the messaging provider may provide to Telecom Network Management 130 (e.g., NetNumber) the phone number associated with the text message, as well as information associated with the brand 170 and campaign 180. The Campaign Registry 150 may also push to Telecom Network Management 130 information about brand 170 and campaign 180. Telecom Network Management 130 handles the transition from P2P to A2P systems, using the phone number, brand 170, and campaign 180 associated with the text message. Telecom Network Management 130 pushes to MNOs 140 the phone number, brand 170, and campaign 180 associated with the text message, so that the MNOs 140 may send the text message accordingly. The Campaign Registry 150 may also push to MNOs 140 text messages and associated information about brand 170 and campaign 180 to determine approved throughput.

Figure 2:
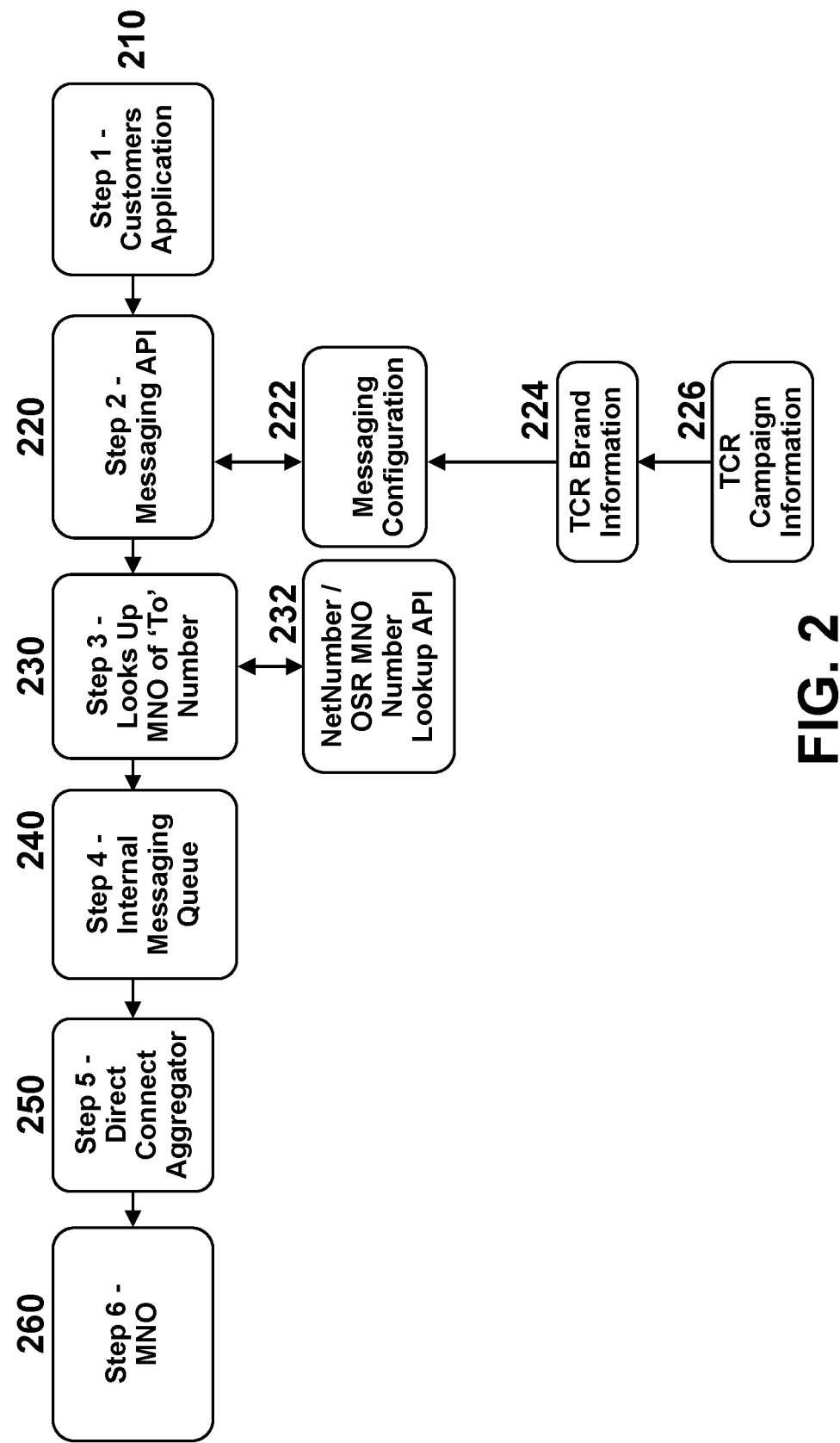
FIG. 2 illustrates an example of an Application to Person messaging path with throttling diagram, in accordance with one or more embodiments.

FIG. 2 illustrates an example of an Application to Person messaging path with throttling diagram, in accordance with some embodiments. The messaging path illustrated in FIG. 2 includes customer application 210, messaging API 220, messaging configuration 222, brand information 224, campaign information 226, query 230, API call 232, messaging queue 240, aggregator 250, and MNO 260. Customer application 210 may be an example of a customer system 110. MNO 260 may be an example of one of the MNOs 140. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

In some embodiments, the messaging API 220 of the online system may receive a request from a customer application 210, an example of customer system 110, to send a text message to a recipient system, the request including a phone number of the recipient system. The text message may include other media beyond text such as images, videos, or links. The request may include information such as a phone number associated with the customer application 210, and the content of the text message. In some embodiments, the online system may determine a brand campaign associated with the customer application 210 based on the phone number associated with the customer application 210 in the request. For example, a business user may use a customer application 210 to compose a text message and to initiate sending that text message to a list of recipients. The customer application 210 may then send an API call to an online system of the Connectivity Partner, where the API call includes details such as the phone number associated with the customer application 210, the phone number for each recipient on the list of recipients, and actual content of the message to be sent, which may include text or other media.

In some embodiments, the messaging API 220 of the online system may send a query to a registry system, such as The Campaign Registry 150, for a throughput allotment applicable to the text message. The throughput allotment specifies, for a given campaign 180 of the customer application 210, limitations on the number of messages that the customer application 210 can send over a time period (e.g., per day). The throughput allotment may vary from campaign 180 to campaign 180, and across MNOs 140, for a given customer application 210. In some embodiments, the throughput allotment may be based on the brand-campaign associated with the text message and request. For example, the online system may perform an internal lookup of the number associated with the customer application 210 to determine which messaging configuration 222 file the number is associated with, enabling the online system to determine the brand information 224 associated with the customer application 210 which is sending the text message and the campaign information 226 associated with the message. Brand information 224 is where the Messaging API 220 stores the throughput allotment associated with brand 170. campaign information 226 is where Messaging API 220 stores the throughout associated with campaign 180. The online system may use the queried brand information 224 and campaign information 226 for the text message to query The Campaign Registry 150 for the approved throughout allotment for each MNO 260 of MNOs 140.

In some embodiments, the online system may send a query 230 to determine the MNO 260 of the set of MNOs 140 that is associated with the phone number of the recipient system. For example, the online system may find the MNO 260 of each recipient on the list of recipients by using a publicly available API call 232 (e.g., NetNumber/OSR MNO Number Lookup API), and then stores the MNO 260 for each recipient.

In some embodiments, the online system may query a log to determine a number of messages sent during a previous time period by the customer application 210 to other recipients associated with the MNO 260 of the recipient system. In some embodiments, the online system may maintain a log of the text messages sent for the current time period (e.g., day), where the log specifies the brand 170 and campaign 180 associated with the text message and the MNO 260 of the phone number of each recipient to which a message was previously sent.

In some embodiments, the online system may, in the messaging queue 240, compare the number of messages from the log to the throughput allotment for the MNO 260 of the recipient system to determine whether the throughput allotment has been reached and whether to add the text message. For example, before sending the text message to each recipient, the online system may be able to identify the applicable throughput allotment based on the MNO 260 of the phone number of the recipient and check the log to determine if the throughput allotment of the MNO 260 for the brand-campaign would be exceeded if the new message were sent. Based on this information, the online system can determine whether sending the message would exceed the applicable throughput allotment.

In some embodiments, the online system may schedule the sending of the text message to the recipient system using an aggregator 250. For example, the throughput allotment would be exceeded, the online system may queue the message for sending at a later period. If applicable throughput allotment would not be exceeded, the online system may send the text message to the recipient immediately and update the log. In some embodiments, the online system may schedule the sending of the text message by determining that the throughput allotment has not been reached and sending the text message. In some embodiments, the online system may schedule the sending of the text message by determining that the throughput allotment has been reached and scheduling the text message to be sent at a later time period. In another example, once the online system determines that the message can be sent, the online system may send the message via an API call to an upstream aggregator 250. The MNO 260 may then send the message from the phone number associated with the customer application 210 to the phone number of a recipient, where the message includes the payload content from the original customer application 210 API request.

Figure 3:
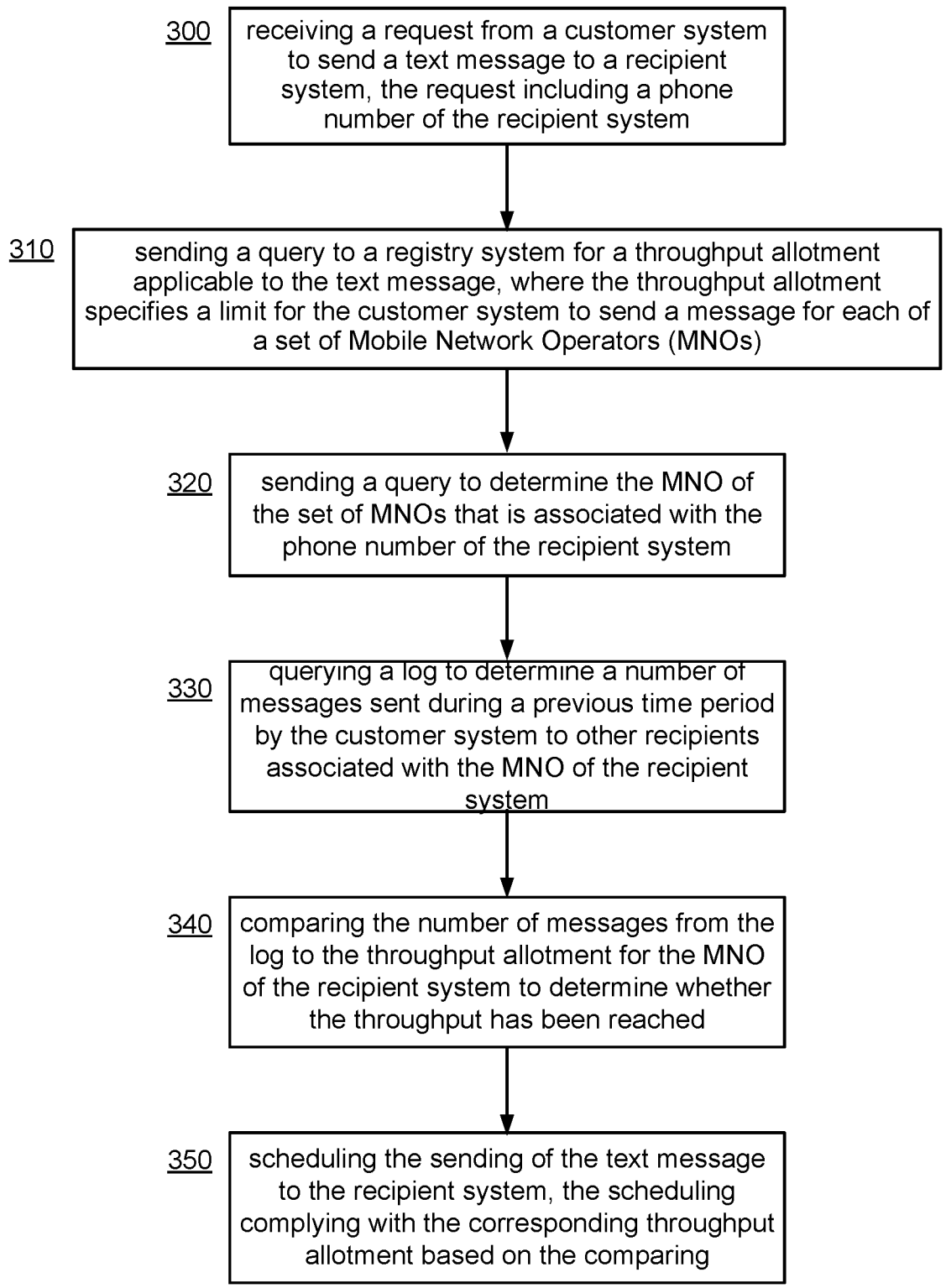
FIG. 3 is a flowchart for throttling text messages, in accordance with one or more embodiments.

FIG. 3 is a flowchart for a method for throttling text messages, in accordance with some embodiments. Alternative embodiments may include more, fewer, or different steps from those illustrated in FIG. 3, and the steps may be performed in a different order from that illustrated in FIG. 3. These steps may be performed by an online system. Additionally, each of these steps may be performed automatically by the online concierge system without human intervention.

In one embodiment, the online system receives 310 a request from a customer system to send a text message to a recipient system, the request including a phone number of the recipient system. The text message may include other media beyond text such as images, videos, or links. The request may include information such as a phone number associated with the customer application 210, and the content of the text message. In some embodiments, the online system may determine a brand campaign associated with the customer application 210 based on the phone number associated with the customer application 210 in the request. For example, a business user may use a customer application 210 to compose a text message and to initiate sending that text message to a list of recipients. The customer application 210 may then send an API call to an online system of the Connectivity Partner, where the API call includes details such as the phone number associated with the customer application 210, the phone number for each recipient on the list of recipients, and actual content of the message to be sent, which may include text or other media.

The online system sends 320 a query to a registry system for a throughput allotment applicable to the text message, where the throughput allotment specifies a limit for the customer system to send a message for each of a set of Mobile Network Operators (MNOs). The throughput allotment specifies, for a given campaign 180 of the customer application 210, limitations on the number of messages that the customer application 210 can send over a time period (e.g., per day). The throughput allotment may vary from campaign 180 to campaign 180, and across MNOs 140, for a given customer application 210. In some embodiments, the throughput allotment may be based on the brand-campaign associated with the text message and request. For example, the online system may perform an internal lookup of the number associated with the customer application 210 to determine which messaging configuration 222 file the number is associated with, enabling the online system to determine the brand information 224 associated with the customer application 210 which is sending the text message and the campaign information 226 associated with the message. The online system may use the queried brand information 224 and campaign information 226 for the text message to query The Campaign Registry 150 for the approved throughout allotment for each MNO 260 of MNOs 140.

The online system sends 330 a query to determine the MNO of the set of MNOs that is associated with the phone number of the recipient system. For example, the online system may find the MNO 260 of each recipient on the list of recipients by using a publicly available API call 232 (e.g., NetNumber/OSR MNO Number Lookup API), and then stores the MNO 260 for each recipient.

The online system queries 340 a log to determine a number of messages sent during a previous time period by the customer system to other recipients associated with the MNO of the recipient system. In some embodiments, the online system may maintain a log of the text messages sent for the current time period (e.g., day), where the log specifies the brand 170 and campaign 180 associated with the text message and the MNO 260 of the phone number of each recipient to which a message was previously sent.

The online system compares 350 the number of messages from the log to the throughput allotment for the MNO of the recipient system to determine whether the throughput allotment has been reached. For example, before sending the text message to each recipient, the online system may be able to identify the applicable throughput allotment based on the MNO 260 of the phone number of the recipient and check the log to determine if the throughput allotment of the MNO 260 for the brand-campaign would be exceeded if the new message were sent. Based on this information, the online system can determine whether sending the message would exceed the applicable throughput allotment.

The online system schedules 360 the sending of the text message to the recipient system, the scheduling complying with the throughput allotment based on the comparing. For example, the throughput allotment would be exceeded, the online system may queue the message for sending at a later period. If applicable throughput allotment would not be exceeded, the online system may send the text message to the recipient immediately and update the log. In some embodiments, the online system may schedule the sending of the text message by determining that the throughput allotment has not been reached, and sending the text message, In some embodiments, the online system may schedule the sending of the text message by determining that the throughput allotment has been reached and scheduling the text message to be sent at a later time period. In another example, once the online system determines that the message can be sent, the online system may send the message via an API call to an upstream aggregator 250. The MNO 260 may then send the message from the phone number associated with the customer application 210 to the phone number of a recipient, where the message includes the payload content from the original customer application 210 API request.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for throttling text messages, the method comprising:
  receiving a request from a customer system to send a text message to a recipient system, the request including a phone number of the recipient system;
  determining a brand campaign associated with the customer system based on a phone number associated with the customer system in the request;
  sending a query to a registry system for a throughput allotment applicable to the text message, where the throughput allotment specifies a limit for the customer system to send a message for each of a set of Mobile Network Operators (MNOs), and wherein the throughput allotment is based on the determined brand campaign;
  sending a query to determine the MNO of the set of MNOs that is associated with the phone number of the recipient system;

querying a log to determine a number of messages sent during a previous time period by the customer system to other recipients associated with the MNO of the recipient system;

comparing the number of messages from the log to the throughput allotment for the MNO of the recipient system to determine whether the throughput allotment has been reached; and scheduling the sending of the text message to the recipient system, the scheduling complying with the throughput allotment for the MNO of the recipient system based on the comparing.

2. The method of claim 1 wherein the text message includes text or other media.

3. The method of claim 1 wherein the request from the customer system further includes the phone number associated with the customer system, and content of the text message.

4. The method of claim 1 wherein scheduling the sending of the text message to the recipient system further comprises:

determining that the throughput allotment has not been reached; and sending the text message, where the text message includes content from the request from the customer system.

5. The method of claim 1 wherein scheduling the sending of the text message to the recipient system further comprises:

determining that the throughput allotment has been reached; and scheduling the text message to be sent at a later time period.

6. A computer program product for throttling text messages, the computer program product comprising a non-transitory computer-readable storage medium containing computer program code for:

receiving a request from a customer system to send a text message to a recipient system, the request including a phone number of the recipient system;

determining a brand campaign associated with the customer system based on a phone number associated with the customer system in the request;

sending a query to a registry system for a throughput allotment applicable to the text message, where the throughput allotment specifies a limit for the customer system to send a message for each of a set of Mobile Network Operators (MNOs), and wherein the throughput allotment is based on the determined brand campaign;

sending a query to determine the MNO of the set of MNOs that is associated with the phone number of the recipient system;

querying a log to determine a number of messages sent during a previous time period by the customer system to other recipients associated with the MNO of the recipient system;

comparing the number of messages from the log to the throughput allotment for the MNO of the recipient system to determine whether the throughput allotment has been reached; and scheduling the sending of the text message to the recipient system, the scheduling complying with the throughput allotment for the MNO of the recipient system based on the comparing.

7. The computer program product of claim 6 wherein the text message includes text or other media.

8. The computer program product of claim 6 wherein the request from the customer system further includes the phone number associated with the customer system, and content of the text message.

9. The computer program product of claim 6 wherein scheduling the sending of the text message to the recipient system further comprises:

determining that the throughput allotment has not been reached; and sending the text message, where the text message includes content from the request from the customer system.

10. The computer program product of claim 6 wherein scheduling the sending of the text message to the recipient system further comprises:

determining that the throughput allotment has been reached; and scheduling the text message to be sent at a later time period.

11. A system for throttling text messages, the system comprising:

one or more processors; and a non-transitory computer-readable storage medium containing computer program code for causing the one or more processors to perform steps comprising:

receiving a request from a customer system to send a text message to a recipient system, the request including a phone number of the recipient system;

determining a brand campaign associated with the customer system based on a phone number associated with the customer system in the request;

sending a query to a registry system for a throughput allotment applicable to the text message, where the throughput allotment specifies a limit for the customer system to send a message for each of a set of Mobile Network Operators (MNOs), and wherein the throughput allotment is based on the determined brand campaign;

sending a query to determine the MNO of the set of MNOs that is associated with the phone number of the recipient system;

querying a log to determine a number of messages sent during a previous time period by the customer system to other recipients associated with the MNO of the recipient system;

comparing the number of messages from the log to the throughput allotment for the MNO of the recipient system to determine whether the throughput allotment has been reached; and scheduling the sending of the text message to the recipient system, the scheduling complying with the throughput allotment for the MNO of the recipient system based on the comparing.

12. The system of claim 11 wherein the request from the customer system further includes the phone number associated with the customer system, and content of the text message.

13. The system of claim 11 wherein scheduling the sending of the text message to the recipient system further comprises:

determining that the throughput allotment has not been reached; and sending the text message, where the text message includes content from the request from the customer system.

14. The system of claim 11 wherein scheduling the sending of the text message to the recipient system further comprises:

determining that the throughput allotment has been reached; and scheduling the text message to be sent at a later time period.

\* \* \* \* \*